United States Patent [19]
Herren

[11] Patent Number: 5,388,940
[45] Date of Patent: Feb. 14, 1995

[54] SCREEN RAIL BOLT RETAINER

[76] Inventor: Harold Herren, 802 Main St., Platteville, Colo. 80651

[21] Appl. No.: 154,585

[22] Filed: Nov. 18, 1993

[51] Int. Cl.⁶ ............... F16B 39/00; F16B 21/18; B07B 1/46
[52] U.S. Cl. .................... 411/107; 411/353; 411/966; 411/970; 209/403; 209/405
[58] Field of Search ............ 411/103, 107, 352, 353, 411/512, 966, 970, 999; 209/403, 405

[56] References Cited

U.S. PATENT DOCUMENTS

| | | | |
|---|---|---|---|
| 1,682,194 | 8/1928 | Selah | 411/999 X |
| 2,492,115 | 12/1949 | Crowther | 411/999 X |
| 2,761,484 | 9/1956 | Sternick et al. | 411/107 X |
| 2,929,474 | 3/1960 | Boardman | 411/999 X |
| 3,084,958 | 4/1963 | Appleton | 411/999 X |
| 3,339,215 | 9/1967 | Flood | 411/966 X |
| 4,530,629 | 7/1985 | Sakow | 411/533 X |

*Primary Examiner*—Neill R. Wilson
*Attorney, Agent, or Firm*—Dean P. Edmundson

[57] ABSTRACT

A retention system is described for retaining a bolt in an opening in a screen rail to prevent the bolt from falling out after the fastener has been removed from the bolt, The retention system is a rubber disk which is positioned adjacent the screen rail, The rubber disk includes an aperture in registry with the opening in the screen rail.

9 Claims, 3 Drawing Sheets

SCREEN RAIL BOLT RETAINER

FIELD OF THE INVENTION

This invention relates to screen decks of the type used for screening crushed rock and gravel to separate it into various segments according to size. More particularly, this invention relates to improved screen rails. Even more particularly, this invention relates to means for retaining the bolts used to attach the screen rails to the screen deck when the rails are loosened.

BACKGROUND OF THE INVENTION

Side rails are commonly used for tensioning and supporting screens in a screen deck. The side rails are removably attached to upright side, walls in the deck so as to engage a screen at its side edges and tension the screen in a secure manner.

Various techniques have been utilized to removably attach the screen rails to the side walls. A common technique involves the use of bolts or pins which extend through apertures in the screen rails and corresponding apertures in the side walls. A fastener is used to secure the bolt or pin in place. The bolt or pin head is thus located on the side of the screen rail which is exposed to the rock being screened.

A particularly useful type of screen rail is described in my U.S. Pat. No. 5,143,223, incorporated herein by reference. In that patent I described a reinforced screen rail in which the upper portion is curved toward one side and in which the lower portion includes a leg projecting in the same direction. A metal reinforcing layer extends substantially along the entire length of the rail. Another reinforcement member surrounds each of the openings in the rail.

When it is necessary to change or otherwise remove a screen in a screen deck, it is necessary to loosen and remove the nuts on the bolts which secure the screen rail to the deck. Then the bolts must be removed from the rail. If the bolts are not removed from the rail, they can easily fall out when the rail is handled, after which the bolts may fall through the screens in the deck or roll down the deck. Consequently, to avoid these problems, the bolts are normally removed from the rail and placed in a can or other container. This requires extra time. Then when the rail is installed again, each bolt must be individually removed from the can and inserted through the registering openings in the rail and the screen deck. This also is time consuming.

There has not heretofore been provided a simple and effective means to retain the bolts in the screen rail when the rail is loosened and detached from the screen deck.

SUMMARY OF THE INVENTION

In accordance with the present invention there is provided a system for retaining bolts in a screen rail when the fasteners have been removed from the bolts. The system involves the use of a rubber member on the inside of the screen rail adjacent each opening in the rail. The rubber member is typically a thin disk which has an opening therethrough with a diameter slightly smaller than the diameter of the bolt.

The rubber retainer member is resilient and grips the exterior surface of the bolt to prevent the bolt from falling out of the rail when the fastener is removed from the bolt. The rubber retainer does not prevent the bolt from being tilted in any desired direction, nor does it prevent the bolt from being pushed through or pulled out of the retainer if that is desired.

Thus, the rubber retainer member prevents a bolt from falling out of the screen rail but does not interfere with desired movement of the bolt in the rail.

Other advantages of the system of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
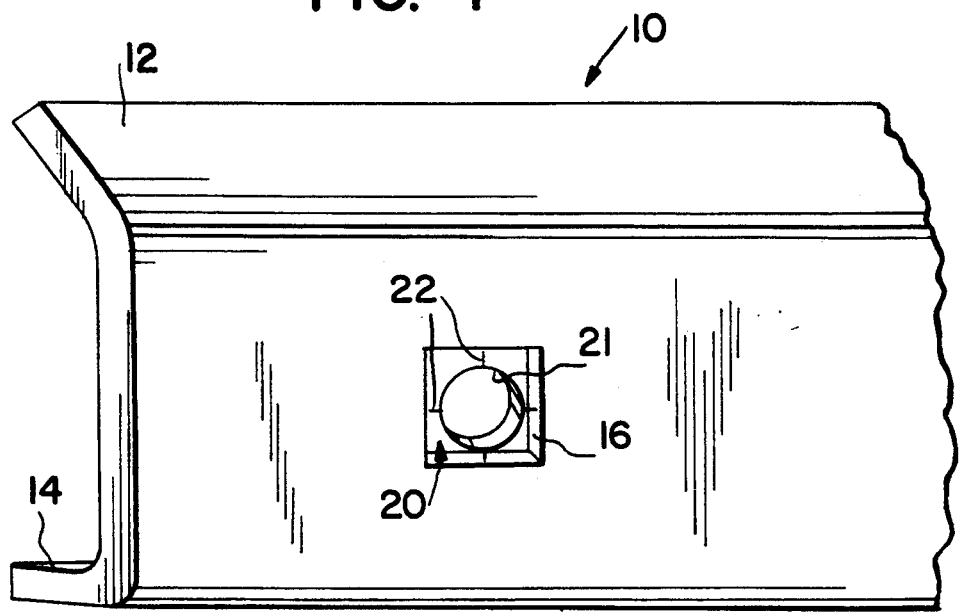
FIG. 1 is a front perspective view of a screen rail which includes a rubber retainer member in accordance with this invention.
Figure 2:
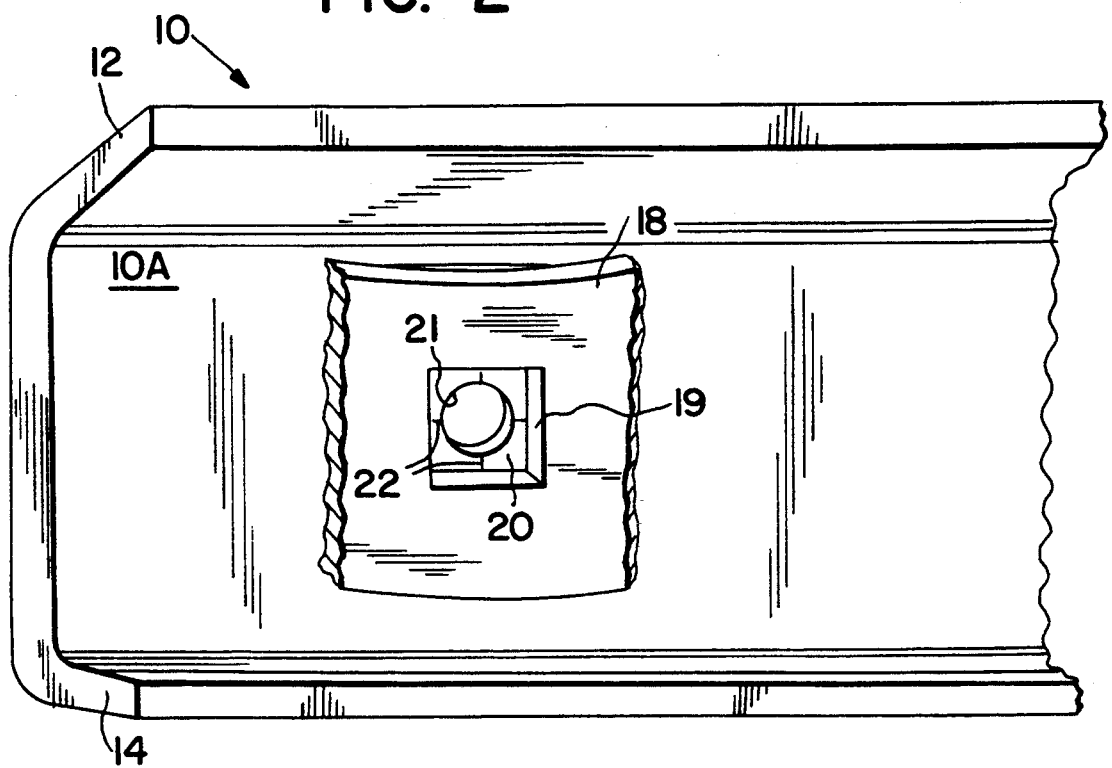
FIG. 2 is a rear perspective view of the screen rail of FIG. 1.
Figure 3:
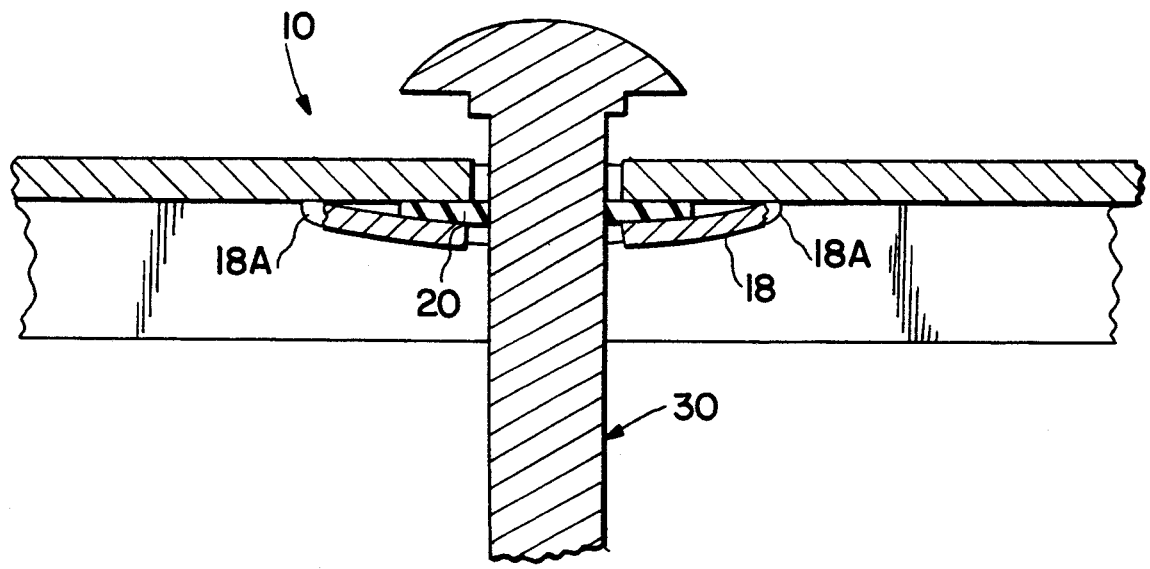
FIG. 3 is a cross-sectional view of a screen rail which includes a rubber retainer member.

The bolt retention system of the invention is illustrated in the drawings. Thus, there is shown a screen rail 10 which includes an upper portion 12 and a lower portion 14. The upper portion is curved in the direction of a first side 10A of the screen rail. The lower portion comprises a leg member which projects in the direction of the first side 10A of the screen rail.

The rail 10 includes a plurality of openings 16 therethrough at spaced intervals along its length. On the side 10A of the rail there is a reinforcement member 18 which is welded along opposite side edges to the rail at 18A. The reinforcement member 18 includes an opening 19 which is aligned or in registry with the opening 16 in the rail. The opening 19 is slightly larger than the opening in the rail.

Between the rail 10 and the reinforcement member 18 there is positioned a rubber retainer means 20. The reinforcement member 18 holds the retainer means in place. Preferably the reinforcement member is slightly arced or curved so that the opposite side edges contact the back side of the rail even when the rubber retainer is positioned between the rail and the reinforcement member 18. The opening 19 is larger than the opening in the rubber retainer 20.

The retainer means preferably comprises a flexible rubber disk having a thickness of about 0.12 inch. The disk includes an aperture 21 therethrough which is in registry with opening 16 in rail 10. The diameter of the aperture is slightly smaller than the diameter of the bolt 30. For example, the diameter of the aperture may be about 0.03 to 0.1 inch smaller than the diameter of the bolt.

Figure 4:
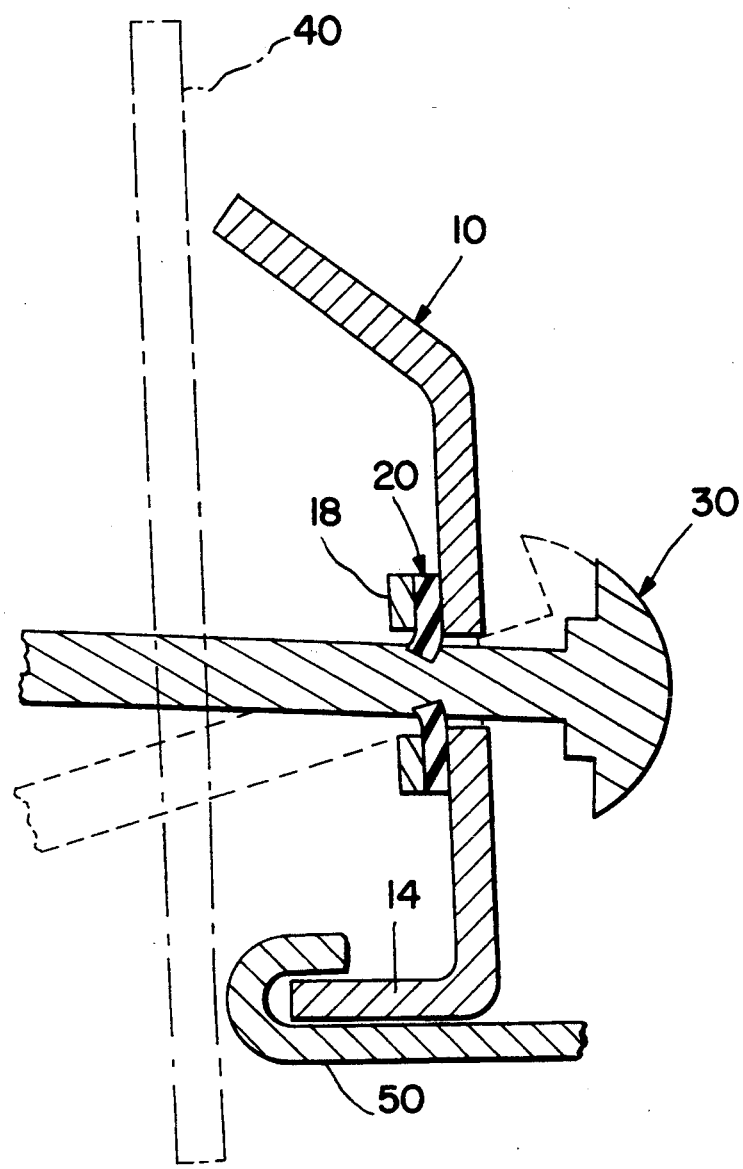
FIG. 4 is a cross-sectional view of a screen rail which includes a rubber retainer member, illustrating the ability of the bolt to tilt relative to the screen rail.

The rubber disk is composed of a resilient rubber material which enables the disk to be deflected slightly so as to permit the bolt to be tilted up, down, or in any desired direction, as illustrated in FIG. 4. The resiliency of the rubber disk also enables the bolt to be pushed through, or pulled out of, the disk if desired.

The ability to tilt the bolt 30 relative to the rail 10 is important when a screen rail is being installed and it is necessary to initially align the bolt with an opening in the screen deck 40. The lower leg portion 14 of the rail engages the side edge of a screen 50 which is secured in the screen deck.

Preferably the rubber disk includes several small slits 22 which extend outwardly from the aperture 21. Preferably there are four such slits evenly spaced around the aperture. The length of each slit is preferably about 0.1–0.15 inch. The inclusion of the slits facilitates movement of the bolt through the aperture, yet the rubber disk does effectively retain the bolt in the opening in the rail to prevent it from inadvertently or accidentally falling out from the rail when the fastener is removed from the end of the bolt.

Figure 5:
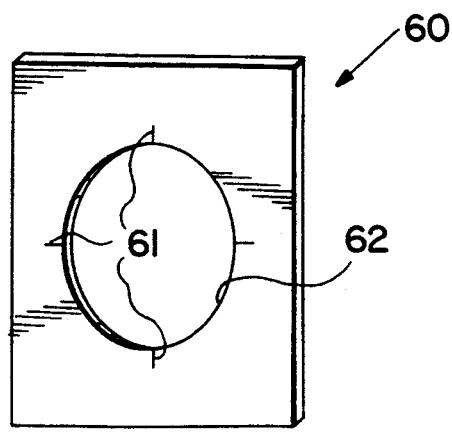
FIG. 5 is a perspective view of one embodiment of rubber retainer member useful in this invention.

In FIG. 5 there is shown one embodiment of rubber retainer member 60 which includes a central opening 62. A plurality of radial slits 61 extend outwardly from the opening 62. The retainer member is composed of flexible rubber. The thickness of member 60 is typically about 0.12 inch. The size of the opening may vary, but preferably the diameter of the opening is slightly smaller than the diameter of the bolt which is to be retained therein.

The shape of the retainer member may vary. It may be rectangular, as shown in FIG. 5, or it may be circular, or oval, or square, etc.

Other variants are possible without departing from the scope of this invention.

What is claimed is:

1. An improved screen rail of the type having first and second side surfaces and upper and lower portions, wherein said upper portion is curved in the direction of said first side surface, wherein said lower portion includes a leg projecting in the direction of said first side surface, and at least one opening through said screen rail for receiving a bolt, wherein the screen rail includes a reinforcement member secured to said first side surface adjacent said opening; wherein said reinforcement member includes an opening in registry with said opening in said screen rail; wherein the improvement comprises a resilient rubber side positioned between said screen rail and said reinforcement member; wherein said reinforcement member includes opposite side edges which are secured to said first side surface of said screen rail; and wherein said rubber disk has an aperture therethrough in registry with said openings in said screen rail and said reinforcement member for engaging said bolt.

2. The improvement in accordance with claim 1, wherein said rubber disk has a thickness of about 0.12 inch.

3. The improvement in accordance with claim 1, wherein said rubber disk includes slits extending outwardly from said aperture.

4. The improvement in accordance with claim 1, wherein there are a plurality of said openings in said screen rail, and wherein one of said rubber disks is positioned adjacent each of said openings.

5. An improved screen rail in accordance with claim 1, wherein said reinforcement member is arc-shaped between said opposite side edges.

6. In a screen rail for use in a screen deck to tension and retain a screen between two upright side panels, wherein said screen rail includes first and second side surfaces and upper and lower portions, wherein said upper portion is curved in the direction of said first side surface, wherein said lower portion includes a leg projecting in the direction of said first side surface, wherein said screen rail includes a plurality of spaced apertures therethrough for receipt of a bolt having a head; further comprising a reinforcement member surrounding each of said openings; wherein said reinforcement member includes opposite side edges, and said reinforcement member is secured to said first side surface of said screen rail; wherein the improvement comprises a rubber retainer means disposed between said reinforcement member and said first side surface of said screen rail adjacent each said opening for engaging said bolt; wherein said retainer means comprises a resilient rubber disk having an aperture therethrough in registration with said opening.

7. The improvement in accordance with claim 6, wherein said rubber disk has a thickness of about 0.12 inch.

8. The improvement in accordance with claim 6, wherein said rubber disk includes slits extending outwardly from said aperture.

9. The improvement in accordance with claim 6, wherein there are a plurality of said openings in said screen rail, and wherein one of said rubber disks is positioned adjacent each of said openings.

* * * * *